United States Patent [19]
Ziolo et al.

[11] Patent Number: 6,048,920
[45] Date of Patent: Apr. 11, 2000

[54] MAGNETIC NANOCOMPOSITE COMPOSITIONS AND PROCESSES FOR THE PREPARATION AND USE THEREOF

[75] Inventors: Ronald F. Ziolo, Webster; Kathleen M. Braungart, Rochester, both of N.Y.

[73] Assignee: Xerox Corporation, Stamford, Conn.

[21] Appl. No.: 08/290,125

[22] Filed: Aug. 15, 1994

[51] Int. Cl.[7] ............... C08K 3/10; C01G 49/08; C01G 49/12; G03G 9/083
[52] U.S. Cl. ............ 524/435; 524/431; 523/200; 252/62.54; 252/62.56; 430/106.6
[58] Field of Search .................. 524/431, 435; 430/106.6; 252/62.54, 62.56; 523/200

[56] References Cited

U.S. PATENT DOCUMENTS

| | | | |
|---|---|---|---|
| 4,474,866 | 10/1984 | Ziolo | 430/106.6 |
| 4,690,960 | 9/1987 | Yamauchi et al. | 524/431 |
| 4,758,490 | 7/1988 | Kitabatake | 430/106 |
| 4,873,102 | 10/1989 | Chang et al. | 427/130 |
| 5,204,457 | 4/1993 | Maruno et al. | 252/62.56 |
| 5,322,756 | 6/1994 | Ziolo | 430/106.6 |
| 5,355,270 | 10/1994 | Umebayashi et al. | 360/135 |

FOREIGN PATENT DOCUMENTS 0015439  1/1984  Japan.

OTHER PUBLICATIONS

Great Britain Patent Application No. 18251/77; Filed May 2, 1977; Theodore Davidson *Super Paramagnetic Developer and Preparation Thereof.*

European Patent Abstract; DC–A89 G08 A18 p. 84; Storage–stable developing Toner–contg. Polymer Obtd. by action of magnesium on ethylene; methyherglic acid copolymer.

European Patent Abstract; DC–A89 G08 506 p. 84—Single Componant magnetic dry electrophotographic developer—mad by polymerising a dispersion of Sol. comprising monomer and magnetic material.

Patent Abstracts of Japan; Publication No. JP59065855; Oosaki Ichirou; Manufacture of Magnetic Toner.

*Primary Examiner*—Tae Yoon
*Attorney, Agent, or Firm*—John L. Haack

[57] ABSTRACT

A magnetic nanocomposite composition comprising from about 0.001 to about 60 weight percent of nanocrystalline particles of $Fe_3O_4$, and from about 40 to about 99.999 weight percent of a resin.

3 Claims, No Drawings

MAGNETIC NANOCOMPOSITE COMPOSITIONS AND PROCESSES FOR THE PREPARATION AND USE THEREOF

CROSS REFERENCE TO COPENDING APPLICATIONS AND RELATED PATENTS

Reference is made to commonly assigned copending applications U.S. Ser. No. 910,803 (D/90063) filed Jun. 9, 1992, entitled "Method of Preparing a Stable Colloid of Submicron Particles", U.S. Ser. No. 08/178,540 (D/90063 I) filed Jan. 7, 1994, entitled "Magnetic and Nonmagnetic Particles and Fluid, Methods of Making and Methods of Using the Same" which discloses low optical density magnetic fluids for use in liquid development compositions and wherein a submicron particle size ion exchange resin may be selected to avoid further micronization or particle size reduction processing steps, and now abandoned U.S. Ser. No. 07/910,805 (D/91332) filed Jul. 9, 1992, entitled "Magnetic Materials and a Method of Preparation". Reference is also made to commonly assigned U.S. Pat. No. 4,474,866 issued Oct. 2, 1984, entitled "Developer Compositions Containing Superparamagnetic Polymers". The disclosures of each of the aforementioned documents are totally incorporated herein by reference.

BACKGROUND OF THE INVENTION

This invention is generally directed to magnetic nanocomposite compositions and processes for the preparation thereof, and more specifically the present invention is directed to a magnetic nanocomposite composition of nanocrystalline $Fe_3O_4$, or ferric oxide particles that are formed in and stabilized by an ion binding polymeric matrix. The nanocomposite compositions of the present invention in one embodiment contain nanocrystalline $Fe_3O_4$ particles, and an ion exchange resin as a polymeric matrix host for the nanocrystalline $Fe_3O_4$ particles. The nanocomposite compositions of the present invention in one embodiment can be prepared by processes comprising loading an ionic exchange resin with aqueous Fe(II) ions, and subsequently treating the resin bound Fe(II) ions successively with an aqueous base and aqueous salt such as an alkali metal sulfide, especially sodium sulfide, in the presence of oxygen. The resulting highly black colored and magnetic nanocomposite $Fe_3O_4$-polymer compositions and of the present invention are useful in magnetic applications, for example, magnetic imaging and printing with dry and liquid developer compositions, and for electrophotography. These materials possess electronic, optical, magnetic and chemical properties due primarily to the extremely small dimensions, for example, about 1.0 to about 100 nanometers of the nanocrystalline $Fe_3O_4$ particles in the nanocomposite.

An important problem which has limited the preparation and maintenance of nanoscale materials is the tendency of the initially small atomically clustered particles to aggregate into larger masses to reduce the energy associated with the high surface area to volume ratio of the nanosized particles. In the aforementioned U.S. Pat. No. 4,474,866, a polymeric matrix, for example, a synthetic ion exchange resin is used to prepare, stabilize, isolate, and characterize related nanocrystalline $Fe_2O_3$ particles as a magnetic polymer composite. In the present invention, there were formulated nanocrystalline composites comprised of $Fe_3O_4$ rather than $Fe_2O_3$ since $Fe_3O_4$ possesses, for bulk materials, about a 20 to about 26 percent greater specific magnetization. The $Fe_3O_4$ resin nanocomposites of the present invention may be post processed and milled to form magnetic composite particles which are useful in formulating aqueous dispersible magnetic fluids and preparing magnetic polymer films.

Prior art formation of submicron or nanometer structures have predominantly included the formation of large particles which are subsequently ground or milled until particles of the desired size are achieved. The grinding and milling times associated with the formation of such particles ranged from 120 to about 2,900 hours. A method of forming dry magnetic submicron particles by precipitation of a magnetic oxide in an ion exchange resin is exemplified by Ziolo in the aforementioned U.S. Pat. No. 4,474,866. According to the method employed therein, an ion exchange resin is loaded with a magnetic ion and chemically converted to a magnetic oxide $Fe_2O_3$. The magnetic loaded ion exchange resin is then recovered and dried. The magnetic polymer resin is then optionally micronized to form a fine magnetic powder.

U.S. Pat. No. 4,101,435 to Hasegawa et al., issued Jul. 18, 1978, discloses a magnetic iron oxide-dextran complex. This compound can be produced by reacting an aqueous sol of magnetic iron oxide with dextran having an intrinsic viscosity of about 0.02 to about 0.5 at an elevated temperature in an aqueous medium, and is useful not only in pharmaceutical and medical fields as a hematinic medium, a radiopaque medium, a blood measuring agent, or a carrier for a medicinal substance, but also in wide range of other technological fields where its magnetic property can be utilized.

U.S. Pat. No. 4,873,102 to Chang et al., issued Oct. 10, 1989, discloses magnetic polymer particles that are formed by swelling porous, polymer particles and impregnating the particles with an aqueous solution of a precursor magnetic metal salt such as an equimolar mixture of ferrous chloride and ferric chloride. On addition of a basic reagent such as dilute sodium hydroxide, the metal salts are converted to crystals of magnetite which are uniformly contained throughout the pores of the polymer particle. The magnetite content can be increased and neutral buoyancy achieved by repetition of impregnation and neutralization steps to adjust the magnetite content to a desired level.

U.S. Pat. No. 4,977,053 to Ohishi et al., issued Dec. 11, 1990, discloses a toner comprising colored particles and a magnetic shell coated thereon, wherein the colored particles are comprised of a binder resin and a coloring agent, and the magnetic shell is formed from an iron oxide type magnetic material. The toner can be fixable at a low temperature or a low pressure, but the toner particles do not agglomerate with each other during long-term storage.

U.S. Pat. No. 5,039,559 to Sang et al., issued Aug. 13, 1991, discloses magnetically attractable particles comprised of a core of magnetic material encapsulated in a metal oxide coating. These particles can be prepared by emulsifying an aqueous solution or dispersion of the magnetic material or precursor, and an aqueous solution or sol of a coating inorganic oxide or precursor, in an inert water-immiscible liquid. The aqueous droplets are gelled, e.g. by ammonia or an amine, recovered, and heated at 250°–2,000° C. The resulting particles are generally smooth spheres below 100 microns in diameter and often of sub-micron size.

U.S. Pat. No. 5,137,796 to Takiguchi et al., issued Aug. 11, 1992, discloses a magnetic developer for developing an electrostatic latent image, including hydrophobic silica fine powder and an insulating magnetic toner comprising at least a binder resin and a magnetic material comprising spherical magnetic particles; wherein 0.16 to 1.6 wt. parts of the hydrophobic silica fine powder is mixed with 100 wt. parts of the insulating magnetic toner. The developer contains 17–60% by number of magnetic toner particles having a particles size of 5 microns of smaller, 5–50% by number of magnetic toner particles having a particle size of 6.35–10.08 microns, and 2.0% by volume or less of magnetic toner particles having a particle size of 12.7 microns or larger.

U.S. Pat. No. 5,204,457 to Maruno et al., issued Apr. 20, 1993, discloses a complex of a carboxyalkyl ether of polysaccharide with a magnetic metal oxide. This complex is extremely excellent in stability in preservation in the form of aqueous sol and has only a low toxicity, and thus is useful, for example, for medical use as a nuclear magnetic imaging molding agent or the like.

Two examples of the many patents which disclose magnetite containing or magnetic toners are U.S. Pat. No. 5,045,423, and U.S. Pat. No. 4,973,538, the disclosure of which are totally incorporated herein by reference.

There remains a need for an economic and convenient process of obtaining very small magnetic particles and magnetic polymeric materials, and more specifically micron and submicron magnetic polymeric particles, without the complications and disadvantages of the aforementioned prior art. Further, there is a need for convenient means for a preparing nanocrystalline iron sulfur and $Fe_3O_4$ containing polymeric composites without the need of having to resort to intensive and expensive particle size reduction or comminution processes for obtaining clean, optionally dry and small composite particles of magnetic nanocrystalline particles contained in a polymeric matrix, for example, from less than about 0.1 to about 100 microns in volume average diameter as determined by a scanning electron microscope or Malvern System 3601 particle size analyzer. Still further, there is a need for nanocomposite nanocrystalline particles that permit low cost, clean, and optionally dry micron and submicron polymeric composite particles that can be selected as a magnetic liquid, and utilized as a component in dry electrophotographic developer compositions, carrier powder coatings, photoconductor pigment or resin coating suspensions, and as toner additives for enhanced photoreceptor development and cleaning.

SUMMARY OF THE INVENTION

It is, therefore, an object of this invention to overcome the problems encountered in the prior art and provide processes for preparing highly magnetic and colored nanocomposite particles with many of the advantages illustrated herein.

In another object of the present invention there are provided simple processes for the formation of magnetic nanocomposite particles, and more specifically magnetic particles which are useful for the preparation of dry and liquid magnetic developer formulations.

Yet, in another object of the present invention there are provided simple and economical processes for the formation of small or nanoscale particles in a polymeric binder medium or matrix that can be easily crushed or micronized to form a micron or submicron sized dry powder for dispersion in a fluid or solid, for example, for dispersion in a second polymer as a bulk host or a non-dissolving liquid vehicle.

Another object of the present invention resides in the provision of simple and economical processes for the preparation of low cost, clean, that is substantially no impurities, and well defined size distribution of highly magnetic and highly pigmented or darkly colored polymeric particles, especially polymeric particles for liquid and dry electrophotographic developer compositions.

Another object of the present invention resides in preparative processes for submicron size magnetic polymeric particles useful for liquid or dry electrophotographic developers.

Further, another object of the present invention resides in simple and economical processes for producing a low cost, clean and well defined particle size distribution of magnetic polymeric particles especially polymeric particles useful as toner additives and magnetic photoreceptor additives.

Additionally, in another object of the present invention there are provided, as a result of the enhanced degree of control and flexibility, processes for the preparation of finely divided polymeric particles with improved magnetic and pigmentation properties.

In still yet another object of the present invention, there are provided nanoparticulate iron sulfur intermediate composites which when exposed to oxygen become magnetic in a magnetic field wherein the acquired magnetization is directly proportional to the amount of oxygen which reacts with the intermediate iron sulfur species. Thus, the iron sulfur composites may be useful as oxygen detectors as measured by differences or changes in the magnetization or color properties of the iron sulfur and the $Fe_3O_4$ nanocomposite.

These and other objects of the present invention are accomplished by providing magnetic nanocomposite compositions. More specifically, the present invention is directed to magnetic nanocomposite compositions comprised of from about 0.001 to about 60 weight percent of nanocrystalline $Fe_3O_4$ particles; and from about 40 to about 99.9 weight percent of an ion exchange resin functioning as a polymeric matrix for the nanocrystalline $Fe_3O_4$ particles. Although not desired to be limited by theory, it is believed that preferred ranges or weight ratios of the $Fe_3O_4$ nanoparticles and the ion exchange resin are those which provide the smallest average $Fe_3O_4$ particle size properties and the largest specific magnetization properties without the composite becoming too brittle as described hereinafter. Preferred or optional weight ratios for particular applications may be readily determined by experiment as illustrated herein. The nanocrystalline $Fe_3O_4$ particles have a volume average particle size range of from about 1.0 to about 1,000 nanometers, and preferably from about 1.0 to 100 nanometers as determined by transmission electron microscopy.

The ion exchange resins useful in preparing the nanocomposite compositions of the present invention include those ion exchange resin polymers possessing chemically addressable sites dispersed throughout their matrix, or on their surface and which sites can be used to either generate a magnetic component in situ or cause the chemical binding of specific ionic iron species, Fe(II), which can be chemically or electrochemically converted into the nanoparticulate $Fe_3O_4$ magnetic species. Specific examples of these resins include sultonated polystyrenes, strongly acidic polyphenolics, polysulfonic acids prepared from monomers of the formula $R—CH_2—SO_3^-H^+$, weakly acidic polyacrylics with a pH of about 5 to 6, for example, polycarboxylic salts prepared from monomers of the formula $R—COO^-Na^+$, wherein R is a polymerizable monomer selected from the group consisting of an alkylene group or arylalkylene group, perfluorinated styrene sulfonic acids, weakly acidic chelating polystyrenes, and the like, with strongly acidic sulfonated polystyrenes such as AMBERLITE® from Bio-Rad Labs , and perfluorinated polysulfonic acids such as NAFION® available from DuPont, being preferred. Other suitable polymers can be selected provided they are of low optical density, or at a minimum have a non interfering color, and the like, including for example, any resins containing cation exchange or exchangeable species, such as a sulfonated polystyrene sodium salt providing the objectives of the present invention are achieved. The term "non interfering color" is meant to indicate that colored resins may be used in formulating the nanocomposites and various powders and liquid dispersions that are useful as imaging and printing materials so long as the color of the resin does not substantially distort the black pigment properties of the $Fe_3O_4$ nanocrystals.

Generally, these ion exchange resin polymers are available commercially in the form of small spheres, or beads ranging in size from about 500 dry mesh to about 25 dry mesh and preferably from about 400 dry mesh to about 200 dry mesh. They are also available in powder form as, for example, sulfonated polystyrene sodium salt. These ion exchange polymer resins when containing for example, a magnetic $Fe_3O_4$ nanocrystalline species prepared by processes of the present invention are referred to herein as magnetic nanocomposites.

Alternatively, the resin may be selected in a submicron size so that no additional micronization step is necessary. Examples of such a matrix include a submicron sulfonated polystyrene resin, available from Rohm & Haas. Additional submicron resins which would be appropriate for use in the present invention include any submicron resins which do not interfere with the characteristics of the material disclosed herein.

Examples of cations contained in the ion exchange resin polymer matrix include those derivable from elements of group IA and IIA of the periodic table of elements. Examples of suitable metal ions are $Na^+$, $Li^+K^+$, $Rb^+$, $Cs^+$, and the like, with $Na^+$ being preferred.

The iron (II) cations for loading the exchange resin are generally provided in the form of water soluble salts, for example, chlorides of iron such as ferrous chloride although corresponding iodides, bromides and fluorides may also be suitable. Other sources of the ferrous metal cation include for example, soluble salts such as water soluble iron acetate, nitrate, perchlorate, sulfate, thiocyanate, thiosulfate, nickel acetate, cobalt acetate, nickel chloride, cobalt chloride, and the like.

The iron (II) cationic species of the transition metal is generally present in the polymer matrix so as to result in a solid particle which has the aforementioned desired magnetic properties. In embodiments for example, the magnetic resin contains about 0.001 weight percent to about 60 weight percent, and preferably from about 0.5 weight percent to about 8 weight percent of the cationic species in the form of an $Fe_3O_4$ oxide. Accordingly, the polymer involved is present in an amount of from about 99 weight percent to about 40 weight percent and preferably from about 95 weight percent to about 85 weight percent.

The magnetic nanocomposite $Fe_3O_4$ loaded resin of the present invention has about 20 to 25 percent greater specific magnetization than the aforementioned low optional density magnetic $Fe_2O_3$ disclosed in U.S. Pat. No. 4,474,866. Thus, the $Fe_3O_4$ nanocomposite of the present invention has a specific magnetization of from about 90 to about 96 electromagnetic units per gram (emu/g) at about 25° C.

The magnetic nanocomposite compositions of the present invention in embodiments are superparamagnetic, that is, the nanocrystalline iron oxide particles within the resin composite matrix exhibit known superparamagnetic properties. The magnetic composites of the present invention can readily be characterized by their relative ease of demagnitization, that is, they are so-called "soft" magnetic materials.

Depending on the particle size and shape of the iron oxide, the aforementioned nanocomposite may exhibit coercivity and remanance when placed in a magnetic field. Generally, for particle sizes less than 10 nanometers, no coercivity or remanance is detectable and thus the material is considered superparamagnetic. For larger particles or particles having an elongated shape, that is acicular particles, coercivity and remanance may be observed. Thus, the magnetic nanocomposite may have a magnetic memory or no magnetic memory at room temperature depending on particle size and shape.

The nanocomposite compositions of the present invention exhibit a regular and predictable physical relationship between the $Fe_3O_4$ loading or weight ratio relative to the resin. Increased loading of $Fe_3O_4$ relative to resin leads to composites which are progressively more brittle or friable and more easily ground or milled into very fine particles but which highly loaded composites tend to behave less like a resin and more like a metal oxide with respect to mechanical processing and rheological properties. Thus the $Fe_3O_4$ loading level is preferably less than about 60 weight percent of the magnetic nanocrystalline $Fe_3O_4$ based on the combined weight of $Fe_3O_4$ and resin.

One important specific embodiment of the present invention comprises the preparation of magnetic nanocomposite compositions as illustrated herein.

In another embodiment of the present invention, there are provided processes for the preparation of magnetic nanocomposites and particularly magnetic $Fe_3O_4$ resin nanocomposites as illustrated herein.

Another specific embodiment of the present invention comprises a process for preparing liquid ink formulations which is achieved by, for example, forming a melt mixture comprised of a magnetic $Fe_3O_4$ nanocomposite or magnetic $Fe_3O_4$ loaded resin, a colorant, a charge director, a charge adjuvant, and optional performance additives; pulverizing the resulting melt mixture by known mechanical means such as ball milling, attrition, piston homogenization, and the like, into fine particles with a volume average diameter of from about 0.1 to about 15 microns useful as a dry developer; and optionally suspending the fine particles in a non-dissolving liquid to form an ink formulation useful as a liquid developer.

In embodiments, the present invention is directed to a process for the preparation of a magnetic $Fe_3O_4$ impregnated resin nanocomposite comprising treating or contacting an anionic resin with an aqueous solution containing Fe(II) ions to afford resin bound Fe(II) ions, and treating the Fe(II) bound resin successively with aqueous solutions of alkali metal hydroxides such as NaOH and alkali metal sulfides such as sodium sulfide in the presence of, or followed by, exposure to oxygen to afford the $Fe_3O_4$ resin nanocomposite. The amount of the alkali metal hydroxide and alkali metal sulfide reagents used to form the desired products are governed by the respective reaction stoichiometries. However, the aforementioned reagents, including added oxygen, are typically used in excess for convenience and completeness of the reactions as illustrated herein.

Although not desired to be limited by theory, it is believed that net reaction stages for the preparative process of the $Fe_3O_4$ nanocrystals of the present invention are as illustrated in the accompanying equations:

$$FeX_2 \cdot xH_2O + Na_2S \rightarrow [Fe_mS_n] \tag{I}$$

$$[Fe_mS_n] + O_2 \rightarrow Fe_3O_4 \tag{II}$$

where an iron halide $FeX_2$ where X is a halide is reacted with, or is associated with, the ion exchange resin is exposed to a source of sulfur ion, such as sodium sulfide, to produce an iron sulfur species [Fe$_m$S$_n$] which represents the apparent, but unisolated and uncharacterized, resin bound iron sulfur intermediate species of reaction (I) where it is believed that the mole ratio of m to n is from about 1:1 to about 1:2, reference F. A. Cotton and G. Wilkinson in "Inorganic Chemistry", page 763. The iron sulfur intermediate [Fe$_m$S$_n$] is subsequently oxidized in the presence of oxygen, for example, in embodiments, with ambient atmospheric or pure oxygen that is bubbled through the reaction mixture, to yield the desired Fe$_3$O$_4$ resin bound species. Optionally, the above mentioned process may be conducted entirely in the absence of oxygen to form as the product a Fe$_m$S$_n$ resin nanocomposite which may be subsequently exposed to oxygen to liberate sulfur from the nanocomposite and be converted from a non magnetic material to a magnetic material in a magnetic field. Thus, the present invention provides a process for preparing nonmagnetic Fe$_m$S$_n$ resin nanocomposites comprising from about 0.001 to about 60 weight percent of nanocrystalline particles of iron and sulfur of the formula Fe$_m$S$_n$ where m is from 1 to about 2 and n is from 1 to about 4, and from about 40 to about 99.999 weight percent of a resin and which nanocomposites are reactive with oxygen. The reaction of the Fe$_m$S$_n$ resin nanocomposite is believed to liberate sulfur and the resulting Fe$_3$O$_4$ nanocomposite product becomes magnetic in a magnetic field. The preparation of Fe$_m$S$_n$ resin nanocomposites and subsequent reaction with oxygen provides a means for detecting oxygen by way of: sulfur liberation and detection; weight changes of the nanocomposite by way of the differences in the atomic weight of the Fe$_m$S$_n$ and Fe$_3$O$_4$ nanocomposite product; and the transition from non-magetic to magnetic material in the presence of a magnetic field. The Fe$_m$S$_n$ resin nanocomposite may be prepared by a process comprising: (a) providing an ion exchange resin as a polymeric matrix; (b) loading the resin matrix with Fe(II) ions; (c) optionally rinsing the Fe(II) loaded resin with water to remove unbound Fe(II) ions; (d) washing the Fe(II) loaded resin with aqueous NaOH; (e) stirring the Fe(II) loaded resin with aqueous sodium sulfide in the absence of oxygen to form an Fe(II) and sulfur species of the formula Fe$_m$S$_n$ where m is from 1 to about 2 and n is from 1 to about 4; and (g) optionally washing with degassed water and drying the Fe$_m$S$_n$ nanocrystalline loaded resin to form the Fe$_m$S$_n$ resin nanocomposite.

The alkali metal hydroxide and sulfide reactants can be used in any suitable amounts such that the objects of the present invention are achieved and after consideration of the aforementioned chemical reaction stoichiometries involved and the magnetic and mechanical properties desired in the final product.

In embodiments, "nanosized" refers to defined as any particulate having dimensions of between about 1 nanometer and about 100 nanometers.

In embodiments, "nanocomposite" refers to a material consisting of a resin or polymer containing nanosized particulate matter such as nanosized crystals of, for example, an iron oxide or nanosized amorphous particles.

Also, the process of the present invention is directed to the preparation of oxygen sensitive and reactive non- or low-magnetic nanocomposites, that is with, for example, a mixture of iron sulfides and iron oxides dispersed in polymer resin as in Example V.

Further, processes of the present invention are directed to the preparation of magnetic nanocomposite particles which are useful in areas such as security printing or marking thermal, magnetic, acoustic or electrostatic ink jet inks, ferrofluids, liquid immersion development inks, carrier coatings, as photoreceptor additives, and as toner additives.

The polymeric resins useful as a binder resins for a dry or liquid toner particle formation are selected from the group of homopolymers and copolymers obtained by polymerization of monomers selected from the group consisting of styrene and its derivatives; unsaturated monocarboxylic acids and derivatives thereof; unsaturated dicarboxylic acids and derivatives thereof; vinyl ketones; vinyl naphthalenes and derivatives thereof; and the like, and mixtures thereof.

Particularly useful ion exchange resins are NAFION® available from DuPont, poly(vinyl benzyl trimethyl ammonium chloride) and related polyelectrolytes, and LIGNOSITE™, such as sodium lignosulfonate, available from the Georgia-Pacific Corporation, Bellingham, WA.

The colorant or pigment in addition to the black colored magnetic nanocomposite useful in developer marking formulations of the present invention is present in an amount of, for example, from about 0.1 to about 30, and preferably 20, percent by weight of the solids content of the developer and is selected from the group consisting of cyan, yellow, magenta, red, green, blue, brown, orange and black pigments such as REGAL 330® or dyes and mixtures thereof.

Illustrative examples of charge directors or charge adjuvants which are believed to function in controlling the sign and the magnitude of the charge on the liquid suspended developer particles that are useful in the present invention include: fatty acids or fatty acid salts as a negative charge directors and are selected from the group aluminum stearate and derivatives thereof, and aluminum t-butyl salicylate and mixtures thereof, and comprise from about 1 to about 15 percent by weight of the solids content of the developer. Among these compounds particularly useful and effective materials are aluminum stearate and block copolymers containing quaternary ammonium hydrogen halide salt side groups.

Examples of nonaqueous or non-dissolving solvents useful in the present invention as a solvent for the liquid developers and developer suspending medium are branched or linear aliphatic hydrocarbons, for example, NORPAR 15 and ISOPAR L or H, (available from Exxon) and mixtures thereof, having from 10 to 25 carbon atoms and which solvent is present from about 50 to about 98 percent of the total weight of the liquid developer.

In embodiments of the present invention the liquid developer suspension comprising the magnetic nanocomposite particles, optional pigment or colorant, nonaqueous solvent, charge adjuvant, and charge director is optionally dispersed with high shear or ball milling to form suspended polymeric particles with a volume average diameter of from about 5 to about 100 microns. The suspended polymeric particles may be processed further by optionally thermally cycling or shocking the dispersion or suspension which is accomplished by rapidly heating the mixture from about 25° C. to about 100° C., then rapidly cooling to about 15° C. to about 40° C., wherein the cycle is accomplished over a period of about 1 minute to about 10 minutes.

A particle size reduction apparatus useful in the preparation of liquid ink formulations of the present invention is known as a piston homogenizer device and is disclosed in Copending application Ser. No. 08/098,150 (D/93114), and comprises: (a) means for introducing the first suspension into the homogenizer and means for removing the resulting second suspension from the homogenizer; (b) a nozzle for ejecting the first suspension at high pressure; and (c) a flat plat or wall whereby collisions of the suspended particles contained in the suspending media under high pressure emanating from said nozzle results in ultra high shear forces and fractures the suspended polymeric particles further into the desired size domain and range of from about 0.1 micrometers to about 5 micrometers volume average diameter.

The pressure employed in the homogenization step is from about 100 Bars to less than about 500 Bars, and preferably of from about 100 to about 350 Bars. At pressures below the lower limit the particle size reduction is unsatisfactory and inefficient, and at pressures above about 350 Bars the dispersion appears to be destabilized and may lead to unacceptable and unmanageable shear thickening of the formulation.

The ink appears to shear thicken or is unstable at elevated pressures in excess or equal to about 500 Bars. At processing pressures less than about 500 Bar and typically between 100 to about 350 Bars, precipitated particles and gels were readily redispersed by the piston homogenizer. The feed suspension also appears to be unstable at temperatures greater than or equal to about 120° F.

The magnetic pigmented polymeric nanocomposite containing particles obtained have an area average particle diameter of from about 1.0 micron to about 2.5 microns as measured by, for example, an Horiba CAPA-500 centrifugation particle size analyzer, a volume average of particle diameter of from about 0.1 micron to about 5 micrometers as measured by, for example, the Malvern System 3601 and a particle geometric size distribution (GSD) of from about 1.2 to about 1.5.

The finely divided dry or liquid developer particles prepared by processes of the present invention may be optionally treated with surface additives to enhance development properties and performance thereof. Numerous surface and charge additives for improving the image performance of toner particle formulations are known in the art and are used in effective amounts of from about 0.01 to about 10.0 weight percent of the total marking particle content. The surface additives are comprised of fine powders of conductive metal oxides, metal salts, metal salts of fatty acids, colloidal silicas, titanates, quaternary ammonium salts, zwitterionic salts, metal complexes, organometallic complexes, or mixtures thereof.

Other surface additives having charge directing or control properties comprise a mixture of a colloidal silica or titanate, and an organoaluminum, organoboron, organozinc, organochromium complex of a salicylic acid or catechol.

Charge control additives for regulating the charging properties of the dispersed developer particles may be added to the surface of the dry developer particles by, for example, roll or cone milling, or may be adsorbed to the surfaces of the liquid dispersed particles.

The charge control director additives in liquid developers typically are inverse micelles used to facilitate particle charging and are comprised of quaternary ammonium salts which are often polymeric in nature, conductive metal oxides, metal and organometallic salts, and the like. Particularly preferred charge director compounds useful in the present invention are comprised of a protonated AB diblock copolymer selected from the group of poly[2-dimethylammonium ethyl methacrylate bromide co-2-ethylhexyl methacrylate], poly[2-dimethylammonium ethyl methacrylate tosylate co-2-ethylhexyl methacrylate], poly[2-dimethylammonium ethyl methacrylate chloride co-2-ethylhexyl methacrylate], poly[2-dimethylammonium ethyl methacrylate bromide co-2-ethylhexyl acrylate], poly[2-dimethylammonium ethyl acrylate bromide co-2-ethylhexyl methacrylate], poly[2-dimethylammonium ethyl acrylate bromide co-2-ethylhexyl acrylate], poly[2-dimethylammonium ethyl methacrylate tosylate co-2-ethylhexyl acrylate], poly[2-dimethylammonium ethyl acrylate tosylate co-2-ethylhexyl acrylate], poly[2-dimethylammonium ethyl methacrylate chloride co-2-ethylhexyl acrylate], and poly[2-dimethylammonium ethyl acrylate chloride co-2-ethylhexyl acrylate], poly[2-dimethylammonium ethyl methacrylate bromide co-N,N-dibutyl methacrylamide], poly[2-dimethylammonium ethyl methacrylate tosylate co-N,N-dibutyl methacrylamide], poly [2-dimethylammonium ethyl methacrylate bromide co-N,N-dibutylacrylamide], poly[2-dimethylammonium ethyl methacrylate tosylate co-N,N-dibutylacrylamide], and the like, and mixtures thereof.

The following examples are being submitted to further define various species of the present invention. These examples are intended to be illustrative only and are not intended to limit the scope of the present invention. Also, parts and percentages are by weight unless otherwise indicated. A comparative example is also provided.

EXAMPLE I

Preparation of Magnetic Nanocomposite of Nanocrystalline $Fe_3O_4$ in an Polymeric Ion Exchange Matrix A cationic exchange resin Bio-Rad AG50 W-X8 ion exchange resin, 50 to 100 mesh, 25 grams, was treated with a two molar equivalent excess based on the calculated number of exchange sites in the resin of an aqueous iron (II) chloride solution to load the resin with iron (II) ions. The resin was then rinsed with 400 mL water, 8 to 10 times, to remove any physisorbed but not chemisorbed ions. The iron loaded resin was then treated stepwise, first with 200 mL of aqueous NaOH (2 molar) and then 300 ml of a 3 percent by weight aqueous sodium sulfide solution. This mixture stirred vigorously in air at room temperature for one to about four hours until the maximum amount of $Fe_3O_4$ forms as determined by the measured magnetic response of the resin. The magnetic resin was then washed thoroughly with water, 400 mL portions six times, and then air dried for 24 hours. Transmission electron microscopy (TEM) characterization of the nanocomposite showed 20 to 120 nanometer sized crystals that were uniformly dispersed throughout the polymer matrix. X-ray and electron diffraction confirmed the presence of $Fe_3O_4$. Elemental analysis of the bound iron and sulfur content arising from the sulfonic acid groups of the ionic exchange resin of the nanocomposite showed the expected 1:2 Fe:S ratio while the saturation magnetization at 10 kG was 16.1 electromagnetic units per gram (emu/g), consistent with the 19% weight loading of $Fe_3O_4$ in the resin. Optical data also confirmed the presence of $Fe_3O_4$ with its characteristically high absorption peak in the visible region of the spectrum.

EXAMPLE II

The process of Example I was repeated with the exceptions that the resin used was an AMBERLITE resin (available from Bio-Rad Labs) having a cross link density of 4% by weight. This was then treated with 6.2 g of FeCl$_2$.4H$_2$O in 200 ml of deionized water to occupy one half the available exchange sites in the resin. Optical and diffraction data showed the presence of Fe$_3$O4. Elemental analysis of the oxidized product showed the expected 1:4 Fe:S molar ratio and the expected 9.5% Fe$_3$O$_4$ by weight, where Fe is believed to be as a bound iron oxide and S is attributable to the sulfonic acid content of the resin. Accordingly, the magnetic saturation moment of the nanocomposite was one half of the above value of Example I at8emu/g.

EXAMPLE III
Toner Preparation

A black magnetic toner composition comprised of a mechanical mixture of 32 grams of a styrene n-butylmethacrylate copolymer resin, containing 58 percent by weight of styrene and 42 percent by weight of butylmethacrylate, 44 grams of the magnetic polymer resin of SILANOX grade 101 prepared, according to Example I, and 0.5 grams cetylpyridinium chloride is prepared by roll milling in a jar for about 2 hours. This mixture is then melt-blended on a two-roll rubber mill and pre-ground using a hammermill. The resulting coarse particulate is micronized to toner size particles, of about 11 microns average diameter, on a Sturtevant Fluid Energy mill. There is obtained a black magnetic toner.

Magnetographic images are generated by imagewise exposing to UV light a 70 micron wavelength chromium dioxide tape, and these images are then developed with the above prepared toner composition. Subsequently, the images are cold pressure transferred to plain paper, and fused resulting in a solid black light color image.

A xerographic image is also generated by forming a latent image on a selenium photoreceptor, and this image is developed with a magnetic brush formed from the above prepared toner particles, and a bar magnet.

EXAMPLE IV

An ink composition comprising 2.5 percent by weight of the micronized material of Example I, 15 percent by weight of cyclohexyl pyrrolidone (from GAF Corporation, Wayne, N.J.), 1 percent by weight of sodium lauryl sulfate (from Fisher Scientific, Fair Lawn, N.J.), and 81.5 percent by weight of toluene is prepared by mixing the ingredients together at room temperature, 25° C., with stirring to obtain a homogeneous solution, and filtering. The ink prepared can be incorporated into a thermal ink jet test fixture. It is believed that images of excellent resolution with no substantial background deposits can be obtained.

Two additional inks can also be prepared, these inks being of the same composition as above except that one contained 0.1 percent by weight of CARBOWAX M20™ a polyethylene oxide/bisphenol, a polymer of the formula:

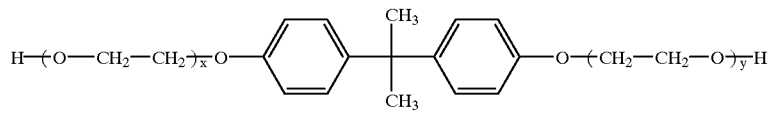

with a molecular weight of 18,000 (from Union Carbide Corporation, Danbury, Conn.) wherein x and y are in approximately equal amounts, and 2.4 percent by weight of the magnetic nanocomposite of Example I, and the second ink contained 0.3 percent by weight of CARBOWAX M20™ and 2.2 percent by weight of the magnetic nanocomposite of Example I. The CARBOWAX M20™ is added to the ink at room temperature and the resulting mixture is stirred for about 5 minutes to obtain a homogeneous solution.

EXAMPLE V
Exclusion of Oxygen

When the procedure in Example I was accomplished under nitrogen or in degassed deoxygenated water, various sulfides of iron formed that were much less magnetic than resin nanocomposite Fe$_3$O$_4$. In this case, the Fe:S molar ratios varied from approximately 1:2 to 1:4 suggesting the presence of various iron oxides formed from residual entrapped oxygen.

Comparative Example I
Exclusion of Sulfur

The procedure in Example I is carried out with the exception that the first formed intermediate product resulting from washing the intermediate Fe(II) loaded resin product with aqueous NaOH, is not subsequently exposed to sodium sulfide. When the aqueous NaOH washed intermediate Fe(II) loaded resin product is exposed to oxygen there results a red colored resin product which is substantially identical in appearance and in magnetic properties to a product sample obtained in the manner disclosed in the aforementioned U.S. Pat. No. 4,474,866. Thus the reaction of the first formed intermediate with an alkali metal sulfide such as sodium sulfide appears to be an important feature in forming the desired and highly magnetic Fe$_3$O$_4$ nanocomposite materials of the present invention.

The above mentioned patents and publications are incorporated by reference herein in their entirety.

Other embodiments and modifications of the present invention may occur to those skilled in the art subsequent to a review of the information presented herein; these embodiments and modifications, as well as equivalents thereof, are also included within the scope of this invention.

What is claimed is:

1. A nanocomposite composition comprising from about 0.001 to about 60 weight percent of resin bound nanocrystalline particles of iron and sulfur of the formula Fe$_m$S$_n$ where m is a number representing iron atoms and is from 1 to about 20 and n is a number representing sulfur atoms and is from 2 to about 40, and from about 40 to about 99.999 weight percent of a resin.

2. A composition according to claim 1 wherein the resin bound Fe$_m$S$_n$ species is quantatively converted to an Fe$_3$O$_4$ species on contact with oxygen thereby providing an oxygen sensor or detector wherein the oxygen content is proportional to the magnetization and color of the resulting Fe$_3$O$_4$ composite product.

3. A nanocomposite composition in accordance with claim 1 wherein the composition becomes magnetic in a magnetic field upon exposure to oxygen in direct stoichiometric proportion to the amount of oxygen reacted therewith.

* * * * *